United States Patent [19]

Lissillour

[11] 4,309,736

[45] Jan. 5, 1982

[54] PROTECTIVE DEVICE FOR LOW-VOLTAGE LINES

[76] Inventor: Albert M. Lissillour, Route de Toul Ar Lan, Tregastel, France, 22730

[21] Appl. No.: 101,718

[22] Filed: Dec. 10, 1979

[30] Foreign Application Priority Data

Dec. 8, 1978 [FR] France .................. 78 34657

[51] Int. Cl.³ .............................. H02H 1/04
[52] U.S. Cl. ..................... 361/119; 179/98; 339/198 S
[58] Field of Search .............. 361/119, 117; 339/198 G, 198 GA, 198 H, 198 S, 198 P; 179/98

[56] References Cited

U.S. PATENT DOCUMENTS

4,146,755 3/1979 Caussé ................... 361/119 X
4,149,211 4/1979 DeHoff ..................... 361/119

Primary Examiner—J. D. Miller
Assistant Examiner—Reinhard J. Eisenzopf
Attorney, Agent, or Firm—Abraham A. Saffitz

[57] ABSTRACT

A protective device protects low-voltage lines such as telephone lines of a cable. It is fitted to a cable connection head which comprises two junctions for connecting two conductive wires of each cable line to two conductive wires of a switching exchange. Each junction includes two separable leaf-spring contacts or a rigid contact. Each line is protected by an overvoltage protective circuit having a first terminal and a second terminal which is connected to ground referenced voltage. Conductive contacts secured to the body of said protective device connect the first terminal of the protective circuit to a contact junction of the head after the protective device is fitted to the head. The fitting of the protective device to the head does not require unwiring of the conductive wires with respect to the contact junctions of the head.

16 Claims, 9 Drawing Figures

PROTECTIVE DEVICE FOR LOW-VOLTAGE LINES

CROSS REFERENCES TO RELATED APPLICATIONS

Applicant hereby makes cross references to his French Patent Application No. PV 78 34657, filed Dec. 8, 1978 and claims priority thereunder following the provisions of 35 U.S.C. 119.

BACKGROUND OF THE INVENTION

1. Field of the Invention

The invention relates to a protective device for low-voltage lines which can be fitted to a cable connection head for connecting a cable of telephone lines to the switching center of these lines, such as a telephone exchange. This device is designed to protect the lines against destructive electrical disturbances such as overvoltage caused by lightning discharges, by electric power transmission lines or, more generally, by high voltage sources.

2. Description of the Prior Art

A protective device for low-voltage lines is disclosed in the U.S. Pat. No. 4,146,755. The cable connection head onto which the protective device is fitted, is of the type having separable leaf-spring contact junctions, ends of which are constituted by pins which are connected, before fitting, to the wires of the cable and of the exchange, respectively. First conductive means associated with a pair of junctions of a line includes a two-sided printed plug sliding within the body of the protective device. This plug carries two pairs of conductive strips of which one on one side connects, after fitting, first terminals of the two protective circuits to the two associated exchange wires through two corresponding leaf-spring contacts of the two associated junctions, and of which the other connects, after fitting, second terminals of the two protective circuits to the exchange ground through the two other leaf-spring contacts of the two associated junctions and adequate connecting means of the head and the protective device. Insertion of the plug separates the leaf-springs of two pairs in order to interconnect two overvoltage protectors. When fitting the protective device to the cable head, the cable wires are no longer connected to the associated pins or leaf-spring ends of the junctions but to two particular pins of the protective device connected through a fuse i.e. an overcurrent protector, to the leaf-springs of the junction still connected to the exchange wires. It appears that, in order to fit the device to the head, it is necessary on the one hand to disconnect the cable wire of each line from the end pin of the associated junction contact leaf-spring and to connect this cable wire to a suitable pin on the device and, on the other hand, to connect the leaf-spring pin, previously connected to the cable wire, to the exchange ground.

For example, when putting electronic telephone exchanges into service, while retaining the system of subscriber's loop cables, the installation of such protective device requires numerous wiring, unwiring and rewiring operations at the exchange frame. This involves high installation costs as well as a temporary and disturbing unavailability of the lines.

OBJECTS OF THE INVENTION

The principal object of this invention is to provide a protective device which can be fitted to the cable head without unwiring the cable and exchange wire connections already existing on the head.

Another object of the present invention is to provide a protective device whose fitting to a cable connection head does not require current interruptions between the wires on the side of the lines and the wires on the side of the switching exchange during normal operation.

SUMMARY OF THE INVENTION

In accordance with the aforementioned objects, a protective device comprises for each line wire:

protective means having a first terminal and a second terminal;

first conducting means secured to the body of said protective device for connecting said first terminal of said protective means to a contact junction of the head after said protective device is fitted to said head and without unwiring the two corresponding conductive wires of said line and the switching exchange with respect of the corresponding contact junction of said head, and second conducting means secured to the device protective body and extending along the entire length of said device body for connecting said second terminals of said protective means to ground referenced voltage through connecting means which are secured to said protective device and said cable head.

According to a first embodiment relating to a head with junctions of the separable leaf-spring contact type, the protective device is in the form of a two-sided printed-circuit board on which all of the protective means are mounted. The upper portion of the board comprises a series of two-sided printed plugs. Each plug carries two pairs of conductive strips. The lower portion of the board is a conductive layer. Two conductive strips on opposite sides of a plug are inserted between the two leaf-spring contacts of the associated line junction and are connected to the first terminal of the associated protective means, which eliminates any unwiring of the associated cable and exchange wires. The second terminals of all the protective means are connected to the conductive layer.

According to a second embodiment relating to a head with rigid contact type junctions, the first conducting means are leaf-spring contacts which are recessed into the body of the device. Each leaf-spring contact has one end which is connected to the first terminal of the associated protective means and has the other end which is projected on the matching side of the device to the head and which is applied by spring pressure to the associated conductive junction of the head. The second conducting means is a plate which extends the entire length of the device. The plate is fixed to the body of the device and contains tabs against which the second terminals of all the protective means are applied.

The ground connecting means can be a cable whose ends, such as plugs or lugs, can be clamped to supplementary conductive elements of the layer or conductive plate and the ground element of the head, without having to unwire existing wire connections on the head. According to the second embodiment, the grounding plate can present a T-section whose vertical member hooks over a grounding bar on the head when the device is fitted onto the head.

It should be noted that a protective device embodying the invention can be removed from the head when desired, for example to substitute in its place a cable line test module or to replace a defective protective means, without having to unwire the wires from the head and thus causing an interruption of traffic on these lines.

These and other objects will be apparent from reading the following detailed description of preferred embodiments of the invention with reference to the accompanying drawing.

DESCRIPTION OF THE PREFERRED EMBODIMENTS

Figure 1:
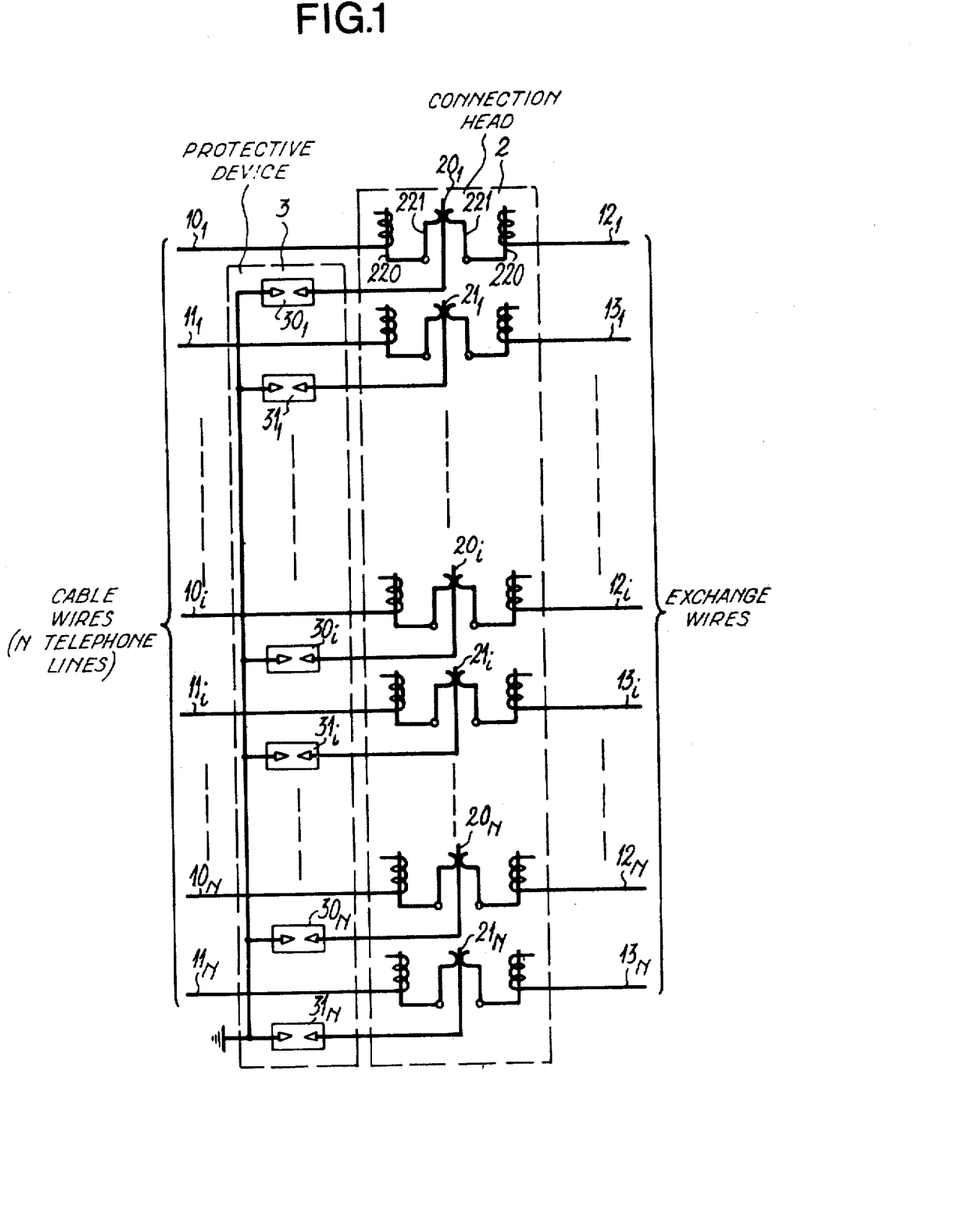
FIG. 1 shows schematically the electrical connection of the junctions of cable and exchange wires of a head to the protective circuits, such as protectors of a protective device embodying the invention.

Referring to FIG. 1, a cable of N telephone subscriber's lines, each with two wires $10_1$–$11_1$ to $10_N$–$11_N$, is connected to N pairs of wires from a telephone exchange, or its frame, $12_1$–$13_1$ to $12_N$–$13_N$, through N pairs of identical electrical junctions $20_1$–$21_1$ to $20_N$–$21_N$ of a cable connection head, respectively. With respect to known heads—as will be seen later on in reference to FIGS. 2 and 7—the head 2 includes, for example, 7 or 32 pairs of junctions. Each junction comprises for example two separable leaf-spring contacts and for two rigid contacts to which are connected one cable wire 10, 11 and the associated exchange wire 12, 13 by screwing, soldering or wrapping. In FIG. 1, it has been assumed that each junction of the head 2, such as $20_1$, has two separable leaf-spring contacts 221 which are connected to respective rigid pins 220 over which the ends of cable wire $10_1$ and exchange wire $12_1$ are wrapped.

The protective device 3 embodying the invention is adapted at connecting of a protective circuit $30_1$ to $30_N$ or $31_1$ to $31_N$ between each junction $20_1$ to $20_N$ or each junction $21_1$ to $21_N$ and the exchange ground, without unwiring all the electrical connections of the above-mentioned cable and exchange wires, i.e. between the end of each cable or exchange wire and the associated head junction. It will be assumed below that each protective circuit contains only one miniature protector, although other protective units such as spark-gaps or non-linear elements could be included in each protective circuit while still lying within the scope of this invention.

Figure 2:
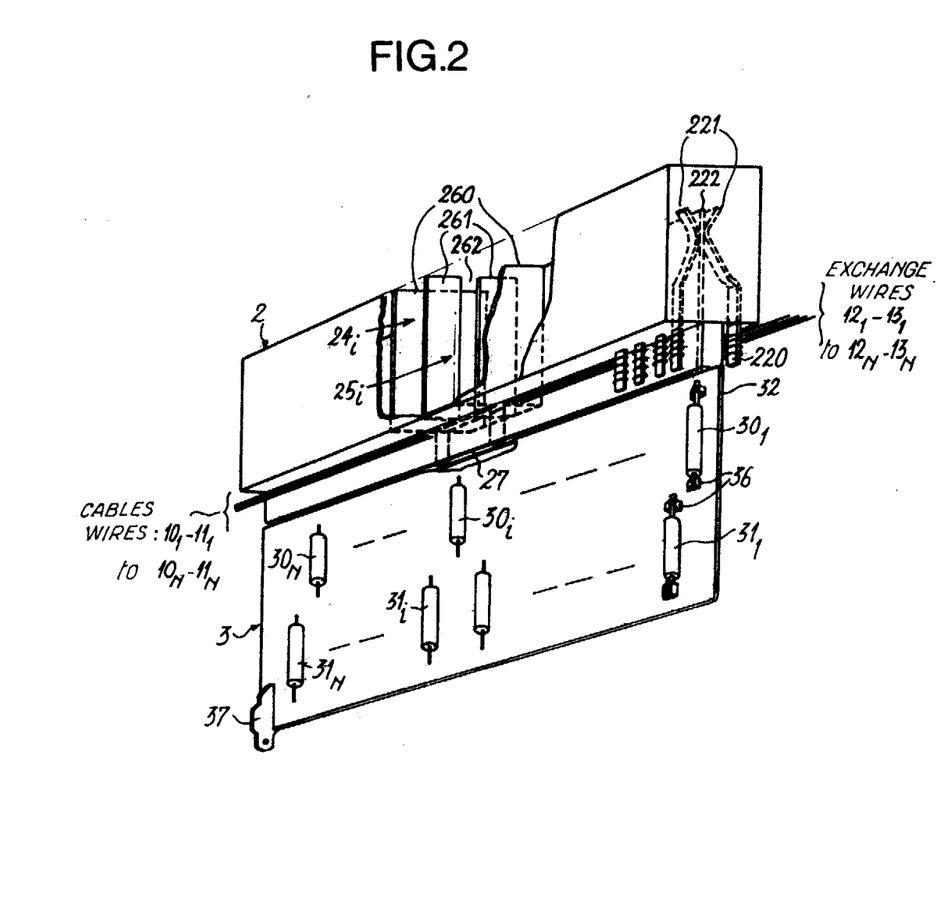
FIG. 2 is a perspective view of a printed circuit protective device fitted to a cable connection head having separable leaf-spring contact junctions.
Figures 3, 5A, 5B:
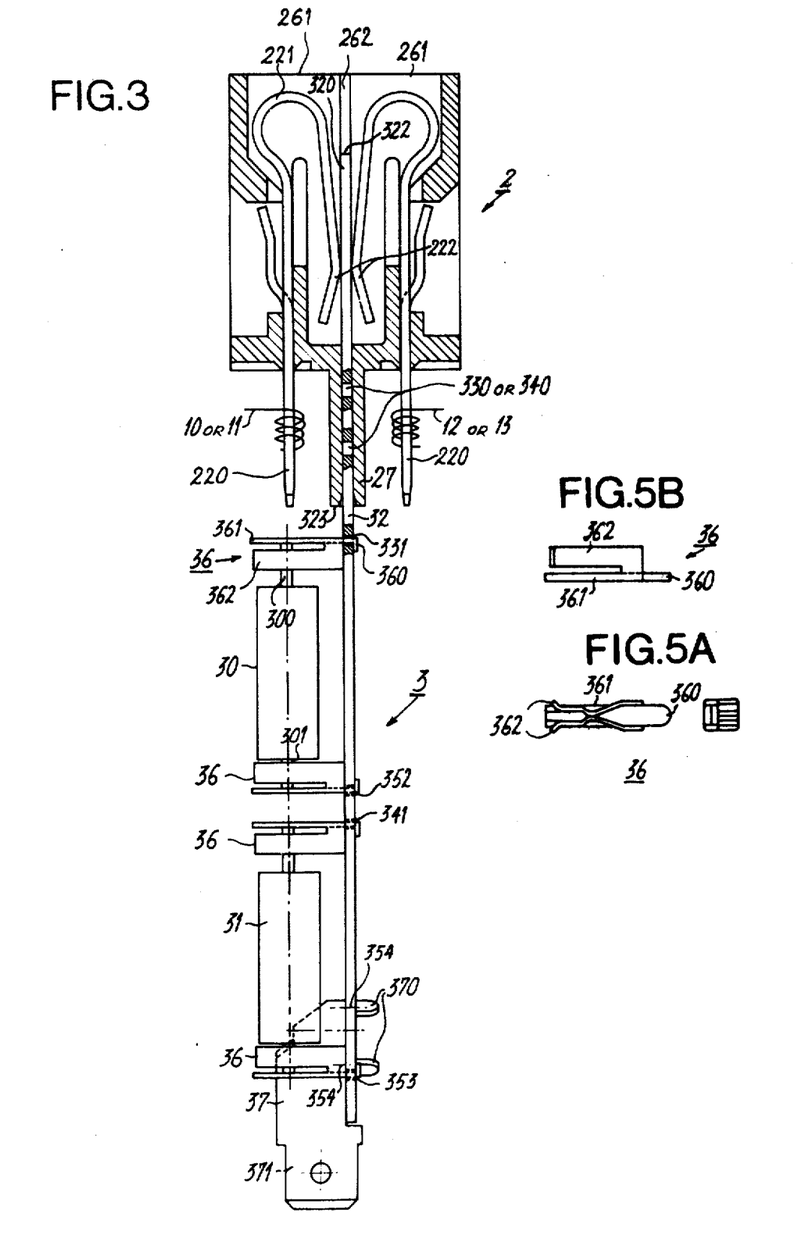
FIG. 3 is a cross sectional view, relating to FIG. 2, through the vertical plane of a cavity of the head, which shows the junction of a line wire and a cable wire and the line protecting circuits.
FIGS. 5A and 5B are bottom and side views of a protector terminal support shown in FIG. 3.

According to a first embodiment, the cable head 2 includes junctions which have separable leaf-spring contacts with the ends in the form of pins, as shown in FIGS. 2 and 3. The head 2 has the shape of a parallelepipedic strip, which is analogous to one disclosed in the U.S. Pat. No. 4,146,755. The hollow housing of this head has been moulded so as to form N pairs of cavities $24_1$–$25_1$ to $24_N$–$25_N$ which are arranged side by side and centrally along the longitudinal symmetry axis of the head 2. Each pair of cavities, such as $24_i$–$25_i$, detailed in FIG. 2, is separated from the two adjacent pairs of cavities by two transverse partitions 260. The two cavities of each pair are isolated by two small transverse partitions 261 which are separated by a central vertical gap 262. Each cavity of the head is formed so as to securely hold two contact leaf-springs 221 which are substantially vertical on each side of the longitudinal symmetry plane and which constitute the junction of a cable wire 10 or 11 and an exchange wire 12 or 13. A leaf-spring can be bent convex with respect to the longitudinal symmetry plane of the head 2, as shown in FIG. 2, or else bent convex and folded back on itself, as shown in FIG. 3. In both cases, the bent ends 222 are applied against one another by the elastic forces of both leaf-springs 221 and coplanary to the longitudinal symmetry plane of the head 2. The other ends of the leaf-springs 221 form tapered pins 220 which emerge vertically from the cavity 24 or 25, symmetrically on either side of a central parallelepipedic hollow projection 27. The projection 27 is common to the cavity pair associated with a telephone line. The ends of the cable or exchange wires 10, 11 or 12, 13 are wrapped or soldered to a pair of the transverse pins 220 associated with a cavity. As shown in FIG. 2, the inside of a hollow projection 27 vertically extends the gap 262 of a pair of cavities 24–25 and has a length equal to that of the pair of cavities. Consequently, the inside of the projection 27 communicates with the two associated cavities at the level of the bends 222 of the two pairs of contact leaf-springs 221 which are housed in these cavities. For such a head 2, a hollow projection 27 is initially assigned to the insertion of a test plug of the associated telephone line in order to connect, for instance, one of the cable wires and/or one of the exchange wires of the line to ground, or to a predetermined voltage for measurements on the telephone line upstream or downstream from the head.

According to this first embodiment, the N hollow projections aligned longitudinally $27_1$ to $27_N$ of the head 2 are used as sockets or jacks to make contact with the upper ends or double connecting plugs $320_1$ to $320_N$ of the protective device 3.

Figure 4:
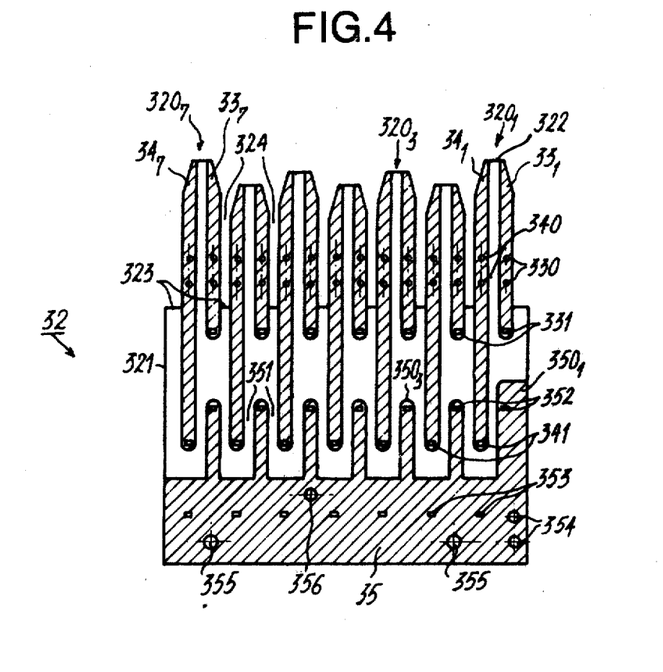
FIG. 4 is a front view of the protective device of FIG. 2, with protective circuits removed.

As shown in FIG. 4, the body of the protective device 3 is a two-sided printed-circuit board 32, which has a lower rectangular portion 321 and vertical rectangular segments forming double connecting plugs $320_1$ to $320_N$. The lower portion 321 has a length substantially equal to that of the series of projections 27 of the connection head 2 and is extended vertically toward the top by plugs $320_1$ to $320_N$, numbering seven in the illustrated case. The plugs are obtained by transverse vertical cuts through a single insulating plate which is constituted by a self-extinguishing epoxy resin laminate reinforced with glass fiber and which has a thickness of 0.8 mm. The cross sections and longitudinal equidistribution of these plugs $320_1$ to $320_N$ are identical to those of the insides of the projections $27_1$ to $27_N$ of the head 2. The equal or substantially equal lengths of the plugs are such that their ends 322, preferably tapered, are at least above the bends 222 of the contact leaf-springs 221 when the plugs are inserted into the projections 27 of the head and when the bottoms 323 of the slots 324 between the adjacent plugs 320, forming the upper longitudinal side of the rectangular portion 321, abut completely against the ends of the partitions 260 which limit longitudinally the holes of the projections 27. The slots 324 provide for the plugging in and positioning on head 2 of the protective device 3. The pinching of each plug $320_1$ to $320_N$ from two associated pairs of contact leaf-springs held firmly in place the protective device 3. In addition, the staggered lengths and transverse and/or longitudinal end tapering of the plugs 320, such as shown in FIG. 4, greatly ease the effort of insertion.

Identical and superposable printed-circuits, for example with 70 μm copper strips which are obtained by photoetching, are supported on each side of the board 32. Each printed-circuit includes on each plug $320_1$ to $320_N$ two first vertical parallel conductive strips $33_1$ to $33_N$ and $34_1$ to $34_N$. The upper ends of the conductive strips are made to come into electrical contact respectively with the bends 222 of the contact leaf-springs 221 which are connected to the cable wires 10, 11 or exchange wires 12, 13 corresponding to the side of the board in question. Relatively to a plug showing in FIG. 4, the lengths of the first conductive strips $33_1$ to $33_N$ on the right side are shorter than those of the second conductive strips $34_1$ to $34_N$ on the left side, in order to align longitudinally the miniature protectors such that, for example, $30_1$ to $30_N$ associated with junctions $20_1$ to $20_N$ of the first cable and exchange wires $10_1$ to $10_N$ and $12_1$ to $12_N$ above the longitudinal alignment of the other miniature protectors $31_1$ to $31_N$ associated with junctions $21_1$ to $21_N$ of the second cable and exchange wires $11_1$ to $11_N$ and $13_1$ to $13_N$. As shown in FIGS. 2 and 3, the protectors are mounted on the same side of board 32 so as to solder their supports in a single tin diffusion soldering operation, for example, although these protectors can be laid out on both sides of the board 32. Moreover, the number of pairs of protectors can be less or more than that of the lines without changing the protection principle.

A rectangular conductive layer 35 is deposited on each side of the rectangular portion 321 and is connected to ground. Small parallel vertical conductive strips $350_1$ to $350_N$ rise above the layer 35 and are opposite the lower ends of the first conductive strips $33_1$ to $33_N$ of plugs on the board 32. Non-metallized slots 351 between the strips 350 contain the lower ends of the second conductive strips $34_1$ to $34_N$ of plugs.

Figure 6:
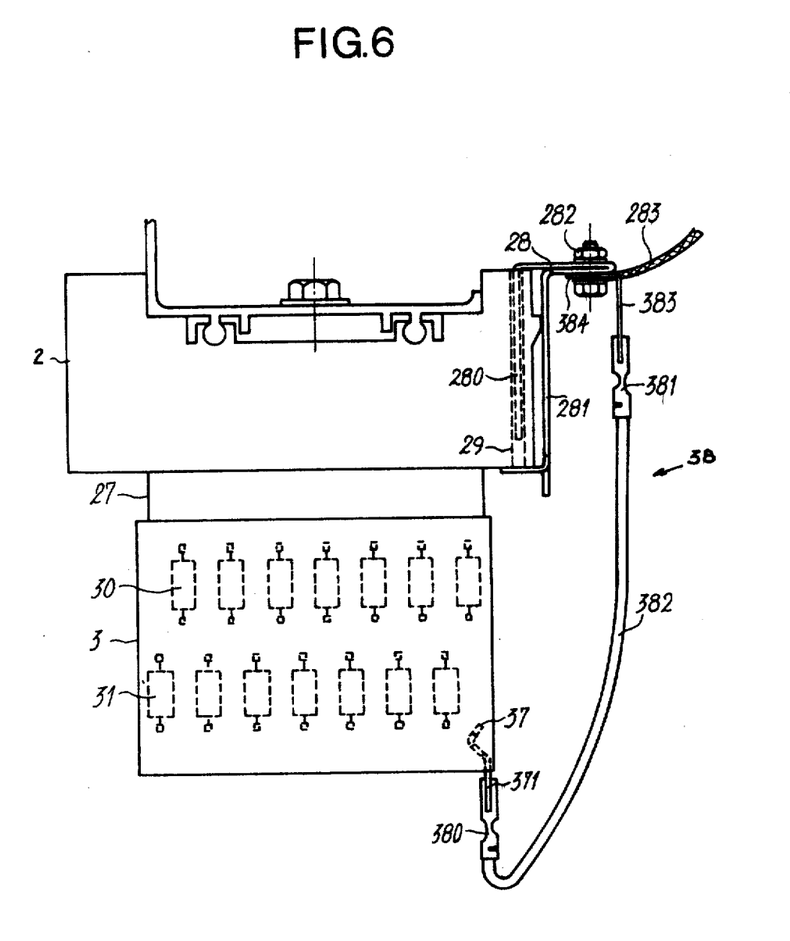
FIG. 6 is a front view similar to FIG. 2 showing the connecting means between the conductive layer of the protective device and the head or exchange ground.

Two superposed conductive strips 33 or 34 of each plug on both sides of the board 32 are connected by means of two metallized holes 330 or 340. The lower end of each conductive strip 33, 34 of a plug has a metallized hole 331, 341 which is aligned vertically with a metallized hole 352, 353 of a small conductive strip 350 or of the conductive layer 35, so that these two holes can receive the lugs 360 of the two conducting supports 36 of a protector 30 or 31. The conductive layer 35 has two metallized holes 354 for receiving and fixing the tabs of a Faston type lug, which connect the conductive layer 35 and, consequently, the second terminals of the protectors to ground or to reference voltage of the exchange, as shown in FIG. 6. Two holes, metallized or not, 355 at the bottom of the layer 35 are also provided for a stiffening reinforcement for board 32, if needed, and a hole, metallized or not, 356 is provided for grasping the board 32 for extraction from the head 2.

Each of the two supports 36 for a protector 30, 31 is detailed in FIGS. 3, 5A and 5B and is of the clip type. A support 36 is formed by a plate 361 whose base is attached to two flexible elbowed arms 362 forming a clip parallel to the plate 361 for the insertion of one of the terminals or cylindrical ends 300, 301 of the miniature protector 30, 31 which abuts against the plate 361. When a protector is installed, its two ends 300, 301 are clipped into the pairs of flexible arms 362 of two supports 36 and the ends of the two plates 361 are inserted into a pair of holes 331–352 or 341–353 of the board 32 and are right-angle folded to form tabs 360, as shown in FIG. 3. Then, for example, the tabs 360 are soldered by tin diffusion to the side of the board 32 opposite to that of the protectors 30, 31.

With reference to FIG. 6, the connecting means 28, 38 for connecting the two conductive layers 35 of the board 32 to the ground referenced voltage of the exchange is schematically shown. As already stated, a male lug of the Faston type is mounted vertically on one of the layers 35, preferably on the same side as that of the protectors 30, 31 by embedding its two tabs 370 into the metallized holes 354 and soldering them simultaneously with the tabs 360 of supports 36, as shown in FIG. 3. Then two female lugs 380 and 381 of the Faston type are crimped to the ends of a multistrand cable 382 and are connected respectively to the male end 371 of the lug 37 and to the cut out male end 383 of a conductive angle bracket. The conductive angle bracket is preferably common to other cable connection heads of the frame of the telephone exchange. At the level of each connection head 2 of a cable, the other side 384 of the bracket is secured horizontally by means of an insert 28 which is folded over to form two angle arms 280 and 281. A screw-nut assembly 282 connects together the conducting angle bracket 384 and the folded end of the insert 28 as well as a braided conductor wire 283 which is connected to the ground of the frame. One 280 of the arms of the insert is inserted into a suitable recess 29 of the head, such as a cylindrical hole, while the other arm 281 is applied against the side opposite the recess 29 so that these arms 280, 281 hold the connection elements rigidly in place.

Figure 7:
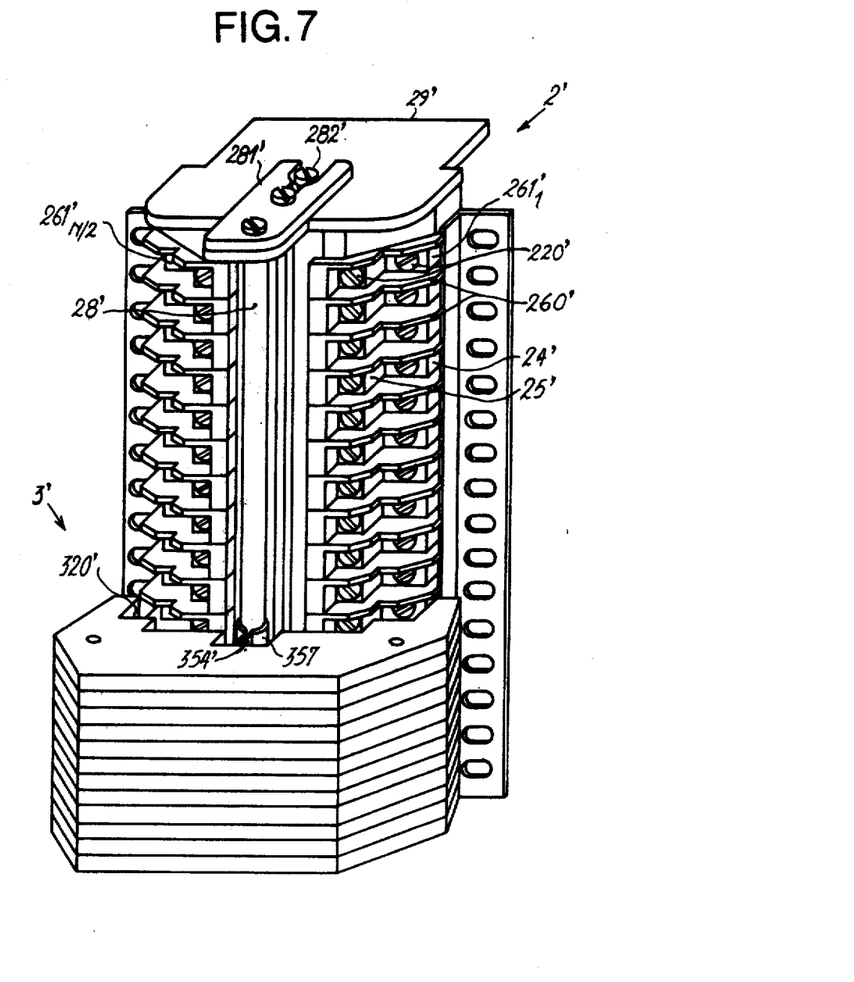
FIG. 7 is a perspective view of a protective device in accordance with a second embodiment, which is shown partially and which is fitted to a cable connection head with the rigid contact junction.

According to a second embodiment shown in FIG. 7, a cable connection head 2' is provided for example for 32 two-wire telephone lines and includes rigid screw-type junctions. It will be noticed that the reference numbers of the elements of the head 2' and protective device 3' with a single index shown in FIGS. 7 and 8 correspond, as closely as possible, to the previously described elements in connection with FIGS. 2 to 6 which have similar functions. The cable connection head 2' is in the form of a substantially parallelepipedic module of a molded insulating material in which N compartments $261_1'$ to $261_N'$ are equidistributed symmetrically on either side of its vertical longitudinal symmetry plane.

Figure 8:
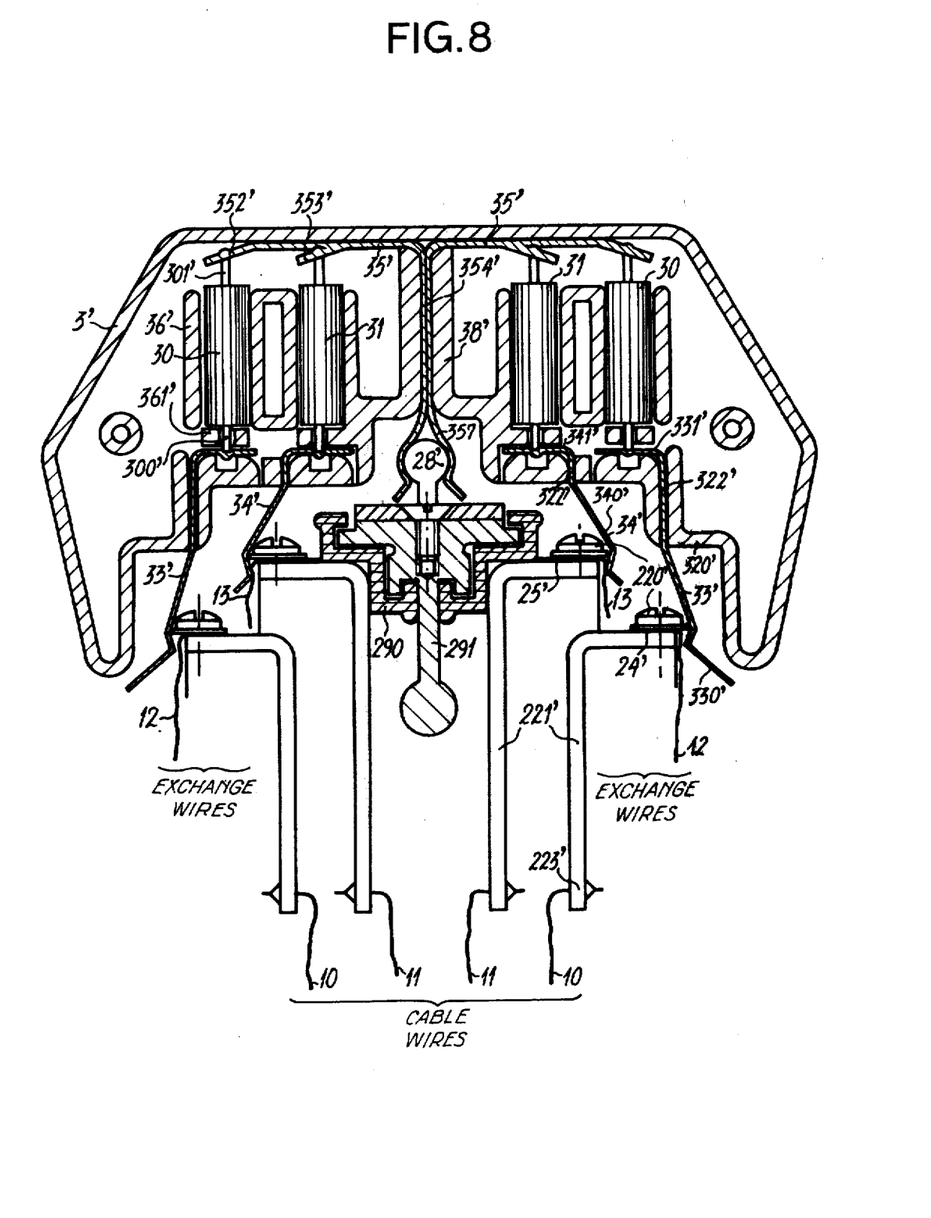
FIG. 8 is a cross sectional view showing a sub-module of the protective device of FIG. 7 which includes two pairs of junctions which are laid out side by side on the head and connected to two pairs of spring contacts, and protective circuits assigned to the two telephone lines.

Each compartment $261_i'$ (with $1 \leq i \leq N/2$ or $N/2+1 \leq i \leq N$) on one longitudinal side is separated from the two adjacent compartments by two transverse partitions 260'. The bottom of each compartment 261' is basically similar to two stairway steps 24' and 25' rising from the associated outer edge. The two steps 24' and 25' of each compartment 261' contain horizontal holes through which two screws 220' are passed to connect the ends of the two exchange wires 12 and 13 corresponding to a telephone line. As shown in FIG. 8, a rigid contact strip 221' is folded at right angle under each step 24',25'. The upper portion of a rigid contact 221' contains a tapped hole to receive a screw 220'. The lower portion of a rigid contact 221' extends perpendicular to the steps and has its lower end which contains a hole 223' for receiving and soldering the end of a cable wire 10, 11. Each set of two screws and two rigid contacts 220'-221' constitutes the two junctions 20, 21 of the cable wire and exchange wires of a telephone line such as described in reference to FIG. 1.

For the attachment of the protective device 3', the head 2' is also equipped longitudinally along the center with a conductive bar 28' which is above the compartments 260' and the ends of which are screwed to two conductive plates 281'. The plates 281' are secured to the outer edges 29' of the head 2' by means of screws 282' and allow the head to be connected to ground of the telephone exchange frame via a braided conductor wire similar to the ground connection shown in FIG. 6. As shown in FIG. 8, the central core 290 of the body of the head 2' made up of plastic material is formed on two lateral molded parts which are thermofitted against a longitudinal aluminium section 291 to which the central conductive bar 28' is fixed.

In accordance with this second embodiment, the body of the protective device 3' is in the form of a compact module whose bottom of each side possesses tongues and grooves 320' which penetrate accurately into the compartments and partitions 261'-260' of the head 2'. In fact, the protective device is constituted by sub-modules which are each assigned to two telephone lines and are each obtained by two plastic shells which are snapped on or ultrasonically welded. Two above tongues limits longitudinally a sub-module. The inner cavity of a sub-module has been molded—as will be seen later—to receive especially the four miniature protectors 30, 31 and four spring contacts 33', 34' which are associated with two pairs of junctions 20-21 located in two compartments 261' on opposite sides of the head 2' and assigned to two telephone lines. The sub-modules are stacked and vertically aligned simply by clipping them onto the head 2', as shown in FIG. 7.

Concerning one of the two telephone lines assigned to a sub-module on both sides of it, two spring contacts 33' and 34' are embedded through two openings 322' in the associated tongue 320' of the sub-module which is also in stairstep chape like that of the compartments 261'. In FIG. 8, the lower end 330', 340' of each spring contact 33' and 34' is appreciably bent and applied by elastic force against an electrical conductive plate just under the head of the screw 220' of the associated junction. The upper end 331', 341' of each contact 33', 34' is bent by 90° and have a depression to lodge the cylindrical end 300' of the first terminal of the corresponding protectors 30, 31. This cylindrical end 300' also passes through the hole of a rib 361' against which is applied the miniature protectors 30, 31. Each protector is inserted between two preformed flexible cylindrical rib supports 36' which form side windows for the insertion of the protectors. The second terminal end 301' of the protectors 30, 31 is lodged in the depression of an arm 352', 353' of a grounding angle bracket 35'. The top sides of two grounding brackets 35' are symmetrical with respect to the longitudinal axis of the sub-module and are applied against the inside of the sub-module body. The vertical sides 354' of the bracket 35' are applied against each other in a longitudinal well 38' of the sub-module. The lower ends of the vertical sides 354' form a claw 357 which engages firmly around the cylindrical bar 28' of the head 2' which is common to all the sub-modules of the protective device 3'.

The protective device 3' is secured firmly by the ground connection consisting of the claws 357 of the sub-modules and the bar 28' and is stabilized laterally by the fit of the tongues 320' in the compartments 261'. It is thus apparent that the insertion of such a module, or one of its sub-modules, on the head 2' does not require the unwiring and rewiring of the junctions between the cable wires and exchange wires, since the attachment of these wires at 223' and 220' is unchanged and since the contact junctions 221' are not replaced. It will be noted that the outer shell of module 3' is formed laterally for correct lifting, as shown in FIG. 8, and that the connection of the bracket contacts 35' which are substantially flat if desired, to the ground terminal of the head can be made, not through a cylindrical bar 28', but by means of connecting elements such as 28 and 38 shown in FIG. 6.

From the standpoint of the presence of high current or over-voltages during strong electrical disturbances for example, the sizes and the physical features, particularly the electrical conductivity of the conductive strip contacts 33, 34 and the conductive layer 35 of the device 3, or of the spring contacts 33', 34' and 35' of the device 3' are determined so as to carry off to ground all very high surge energies, such as those due to lightning discharges but also to provide no isolation and contact resistance for the normal operation of telephone lines. For example, for the protective device 3 in accordance with the first embodiment shown in FIGS. 3 and 4, the conductive strips 33 and 34 are of copper having a 70 $\mu$m thickness a 2.8 mm width and at most about 40 mm and 60 mm length. Each conductive strip 35 has an area of about 15 cm$^2$. The printed circuit of each side of the board 32 is protected by a tin and lead base deposit having a 15 $\mu$m thickness.

Although this invention has been described in connection with two specific embodiments thereof, it should be understood that the invention is not limited to the disclosed embodiments, since many modifications can be made in the disclosed structures without departing from the basic principles of operation set forth in this application. For example, at each junction of a cable wire and an exchange wire, besides a protector, a spark gap, a varactor or any other non-linear element can be connected in parallel with the protector and be supported by the body of the protective device. Moreover, if necessary, one or more telephone lines associated with the head can be left unprotected without in any way changing the operation of the protective device. In that case, the protectors associated with those lines are suppressed. Lastly, the structural layout of the conductive and protective elements inside the protective device can be modified depending upon the local environment of the head and also the type of cable connection head other than the leaf-spring contact-type junction or screw contact-type junction.

What I claim is:

1. A protective device for low-voltage lines of a cable which is fitted to a cable connection head comprising two contact junctions for connecting in parallel two conductive wires of each cable line to two conductive wires of a switching exchange, said protective device comprising for each pair of a line wire and an exchange wire connected through a contact junction:

overvoltage protective means having a first terminal and a second terminal;

first conducting means secured to the body of said protective device for connecting said first terminal of said overvoltage protective means to said contact junction after said protective device is fitted to said head and without unwiring said line wire and said exchange wire with respect to said contact junction; and     second conducting means secured to said protective device body and extending along the entire length of said protective device body for connecting said second terminal of said protective device to ground referenced voltage through connecting means which are secured to said protective device and to a ground element of said cable head.

2. A protective device as claimed in claim 1 in which said connecting means comprises a cable whose ends fit into additional conducting elements of said second conducting means and of said ground element of said head.

3. A protective device as claimed in claim 2, in which said additional conducting elements include a lug which is rigidly attached to a conducting layer of a printed-circuit board of said second conducting means.

4. A protective device as claimed in claim 2, in which said additional conducting elements include a lug which is rigidly attached to a strip of said second conducting means.

5. A protective device as claimed in claim 1, in which a non-linear element such as a varactor is connected in parallel with each overvoltage protective means.

6. A protective device for low-voltage lines of a cable which is fitted to a cable connection head including two contact junctions for connecting in parallel two conductive wires of each cable line to two conductive wires of a switching exchange, each of said contact junctions comprising two spring contacts each having a first end elastically applied against the first end of other and a second end connected to a line wire or an exchange wire, respectively, said protective device comprising:

overvoltage protective means for each pair of a line wire and an exchange wire connected through a contact junction, each overvoltage protective means having a first terminal and a second terminal; and     a two-sided printed-circuit board for supporting said protective means;

said printed-circuit board comprising:

a pair of first conductive strips opposite each other on the two sides of said board for connecting said first terminal of said overvoltage protective means for a line and exchange wire pair to said first ends of said two spring contacts of a junction of said head, after a portion of said board supporting said two first conductive strips is inserted between said two spring contacts of said junction and without unwiring said line and exchange wires of said pair with respect to said second ends of said two spring contacts of said junction; and     a conductive layer extending the entire length of the body of said protective device for connecting said second terminals of all of said protective means to ground referenced voltage through connecting means which are secured to said printed-circuit board and to said cable head.

7. A protective device as claimed in claim 6, in which said two first conductive strips opposite each other on said two sides of said two-sided printed-circuit board are connected through at least one metallized hole.

8. A protective device as claimed in claim 6, in which said two-sided printed-circuit board comprises:

two sided printed plugs, each carrying two pairs of said first conductive strips for connecting said first terminals of said two overvoltage protective means for said two wires of a line to two contact junctions of said head, and slots between said adjacent plugs as abutments against hollow projections of the body of said head in each of which a plug penetrates.

9. A protective device as claimed in claim 8, in which the ends of said two-sided printed plugs are tapered.

10. A protective device as claimed in claim 6, in which said pairs of said first conductive strips are distributed into first pairs and second pairs;

said first pairs of first conductive strips being connected to said first terminals of first overvoltage protective means which are aligned on said printed-circuit board longitudinally to the body of said head;

said second pairs of first conductive strips being connected to said first terminals of second overvoltage protective means which are aligned on said printed-circuit board in parallel with the alignment of said first overvoltage protective means, and in which said conductive layer of said printed-circuit board comprises second conductive strips connected to said second terminals of said first overvoltage protective means;

said second conductive strips rising from said conductive layer below said first pairs of said first conductive strips and forming slots therebetween;

the ends of said second pairs of said first conductive strips connected to said first terminals of said second overvoltage protective means being contained in said slots; and     said second pairs of said first conductive strips being longer than said first pairs of said first conductive strips by at least one length of said overvoltage protective means.

11. A protective device for low-voltage lines of a cable which is fitted to a cable connection head including two rigid stationary connections for connecting in parallel two conductive wires of each cable line to two conductive wires of a switching exchange, said protecting device comprising:

overvoltage protective means for each pair of a line wire and an exchange wire, each overvoltage protective means having a first terminal and a second terminal;

conductive spring contacts secured to body of said protective device and applied against said rigid stationary connections of said head when said protective device is fitted to said head, each conductive spring contact connecting said first terminal of one protective means to a rigid stationary connection of said head; and     conducting means secured to said protective device body and extending along the entire length of said protective device body for connecting said second terminals of said overvoltage protective means to ground referenced voltage through connecting means which are secured to said protective device and to a ground element of said cable head.

12. A protective device as claimed in claim 11, in which said conducting means includes a conductive strip which is attached to said protective device body and comprises depressions in which said second terminals of said overvoltage protective means are engaged.

13. A protective device as claimed in claim 11, in which said overvoltage protective means are lodged into support compartments of said protective device body.

14. A protective device as claimed in claim 11, in which the side of said protective device facing said head comprises tongues which fit into compartments of said head which contain said rigid stationary connections and from which said spring contacts emerge.

15. A protective device as claimed in claim 11, divided into separable sub-modules, each associated with two pairs of a line wire and an exchange wire.

16. A protective device as claimed in claim 12 in which the section of said conductive strip has the form of a T having a vertical arm, the free end of said vertical arm comprising a claw engaging with a grounding bar of said head when said protective device is fitted to said head.

* * * * *